United States Patent [19]

Felsing

[11] 4,193,614

[45] Mar. 18, 1980

[54] PASSIVE RESTRAINING BELT FOR SEATED VEHICLE OCCUPANT

[75] Inventor: Larry E. Felsing, Minneapolis, Minn.

[73] Assignee: William A. Braddock, Minneapolis, Minn.

[21] Appl. No.: 13,163

[22] Filed: Feb. 21, 1979

Related U.S. Application Data

[63] Continuation-in-part of Ser. No. 861,403, Dec. 16, 1977, abandoned.

[51] Int. Cl.$^2$ .............................................. B60R 21/02
[52] U.S. Cl. ..................................... 280/804; 297/469
[58] Field of Search ........................ 280/802, 803, 804; 297/469

[56] References Cited

U.S. PATENT DOCUMENTS

| | | | |
|---|---|---|---|
| 3,770,294 | 11/1973 | Hammer | 280/803 |
| 3,827,714 | 8/1974 | Lefenore | 280/804 |
| 3,831,974 | 8/1974 | Keppel | 280/804 |
| 3,833,239 | 9/1974 | Coenen | 280/804 |
| 3,863,983 | 2/1975 | Wriedt | 280/804 |

*Primary Examiner*—Robert R. Song
*Attorney, Agent, or Firm*—Kinney, Lange, Braddock, Westman & Fairbairn

[57] ABSTRACT

A restraining belt includes an inboard lap belt piece connected to an outboard lap belt piece and a shoulder belt portion connected to the junction of the two lap belt pieces. One end of the inboard lap belt is received by a conventional inertia-lock belt retractor mounted rearward of a vehicle seat and inboard of it. An end of the outboard lap belt is received by a similar retractor mounted rearward of the seat and on the outboard side of it. An end of the shoulder belt is received by a third retractor mounted to a vehicle body rearward of the seat and adjacent to and above a frame for a vehicle door. There is a lower horizontal track adjacent the bottom edge of the door and door frame; and an upper track on the vehicle body along the uper edge of the door frame. An apertured outboard lap belt holder surrounds the outboard lap belt, and is movable with a carrier in the lower track from position adjacent the outboard retractor when the door is closed to a position adjacent the forward edge of the door when the door is opened. An apertured shoulder belt holder surrounds the shoulder belt and is movable with a carrier in the upper track from position adjacent the shoulder belt retractor when the door is closed to position adjacent the forward edge of the door frame when the door is opened.

28 Claims, 9 Drawing Figures

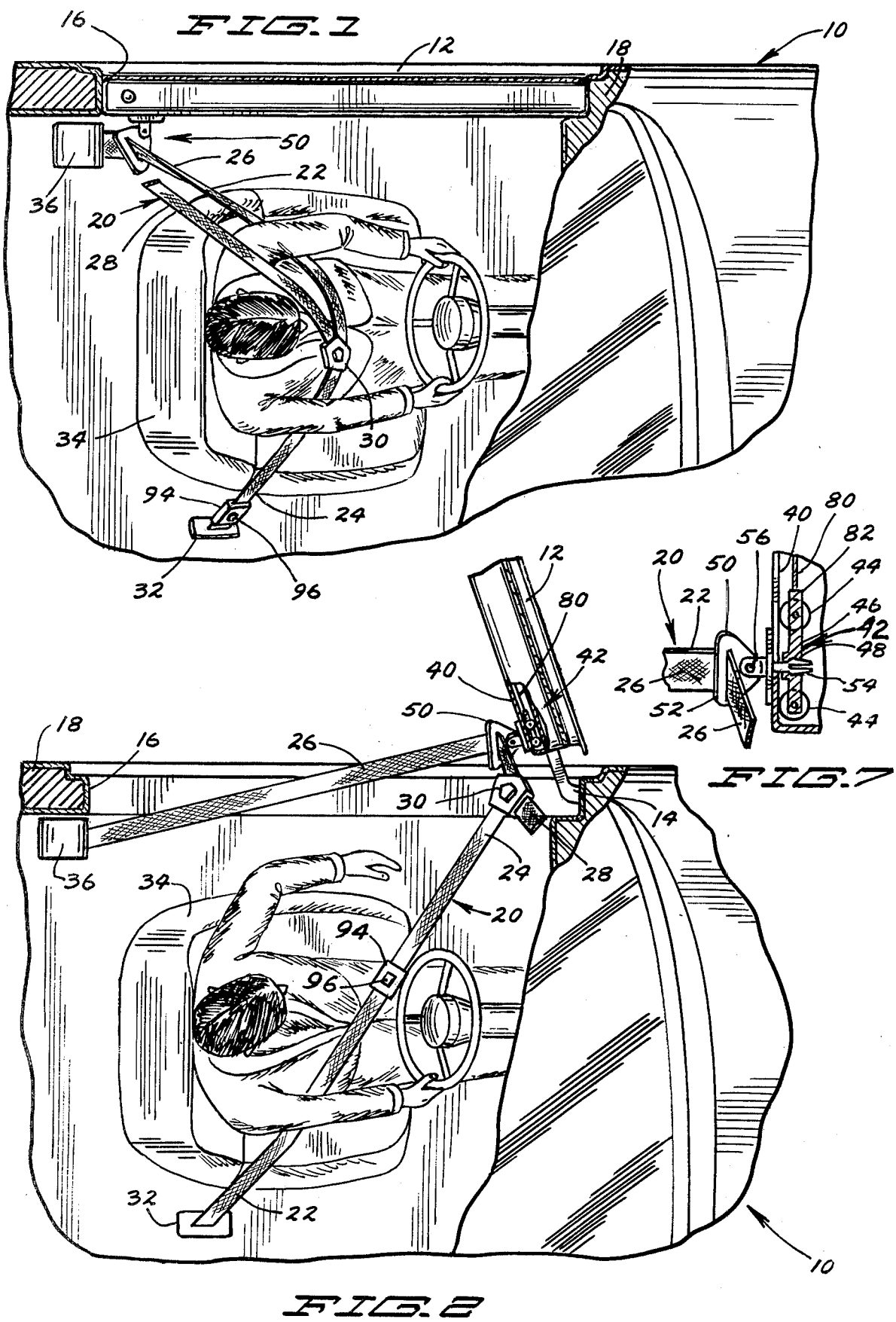

PASSIVE RESTRAINING BELT FOR SEATED VEHICLE OCCUPANT

This application is a continuation-in-part of my co-pending application Ser. No. 861,403, filed Dec. 16, 1977, now abandoned.

BACKGROUND OF THE INVENTION

This invention has relation to a restraining belt for a seated vehicle occupant. The belt will be situated in clearing relationship to the vehicle occupant and to the vehicle doorway when the door is open and the occupant is entering or leaving the vehicle; and will automatically move into restraining relationship to the seated vehicle occupant when the door is closed.

Lap belts and shoulder harnesses properly positioned with respect to a vehicle occupant have been demonstrated and acknowledged to be extremely important factors in reducing the amount and seriousness of injuries and in reducing fatalities in connection with motor vehicle crashes.

Because of the failure of average and careless vehicle drivers to "put on" such restraints and to insist that their passengers put on such restraints every time they enter their motor vehicles, these belts and harnesses have been largely ineffective, even though they are present in each motor vehicle by action of law.

In an effort to achieve some measure of safety for vehicle occupants in head on crashes only, Congress had required that a passive retaining belt or an explosive device be installed in motor vehicles. The explosive device is designed to be tripped or triggered by a sharp change in inertia and will substantially instantaneously fill the space between the vehicle occupant and the windshield and dash of the vehicle to try to absorb some of the force of the momentum of the vehicle occupant as that occupant is thrown toward the front of the car. Such devices are commonly known as "air bags", are expensive to install, are expensive to maintain and reload after being exploded, are susceptible to accidental discharge in less than crash situations, and are of no particular value should the vehicle swerve on the crash and throw the occupant to either side, or toward the top or bottom of the car.

Attempts have been made to devise a passive restraining belt system and apparatus which will be in clearing relationship to a vehicle occupant when that occupant enters the vehicle and takes a position in the seat of the vehicle, and which will move automatically into restraining relationship with respect to the vehicle occupant before the vehicle moves forward. Such prior art devices have suffered from serious drawbacks, and have not become generally accepted and used for that reason.

For example, the following patents disclose structures which purport to hold a shoulder belt and a lap belt in clearing relationship with respect to a vehicle seat when the vehicle door is opened, but which, in reality, require that the vehicle occupant lift or push one or both of the belts out of the way to enter the seat, or literally crawl under one or both of the belts to get to the seat:

U.S. Pat. No. 3,583,726 to Lindblad, granted June 8, 1971;
U.S. Pat. No. 3,679,229 to Weststrate, granted July 25, 1972;
U.S. Pat. No. 3,680,883 to Keppel et al, granted Aug. 1, 1972;
U.S. Pat. No. 3,770,078 to Keppel et al, granted Nov. 6, 1973;
U.S. Pat. No. 3,727,944 to Wize, granted Apr. 17, 1973;
U.S. Pat. No. 3,831,974 to Keppel, granted Aug. 27, 1974;
U.S. Pat. No. 3,840,249 to Strom, granted Oct. 8, 1974;
U.S. Pat. No. 3,914,254 to Nagano et al, granted Oct. 28, 1975;
U.S. Pat. No. 3,968,978 to Hayashi, granted July 13, 1976.

The major objection to the use of structures which entail lifting and holding the belts out of the way or letting them slide over the occupants clothing comes from vehicle occupants wearing hats and "dress-up" clothing which can be disarranged, snagged or soiled in the process. When such belts are an irritant to the vehicle occupant, ways will be found to circumvent their use.

Many passive seat belt arrangements of the prior art suffer from the further severe disadvantage that they rely on the vehicle door as an anchoring point for one or two of the restraining belts. In severe car crashes, involving rollovers, for example, the car doors often become detached from the vehicles. In such a situation, at best, the occupant is freed from any or part of the restraining belt arrangement and is thrown around within and/or from of the vehicle as if there was no restraining belt present. At worst, if the forces at work cause the departing car door to draw the restraining belt(s) down against the occupant, the belts will tend to cut the occupant in two. In many such situations, first the belts will be forced back against the occupant, and then will be instantaneously released to allow the occupant to be thrown around inside the vehicle or out of the open doorway.

Patents which show structures suffering from this major deficiency include:

U.S. Pat. No. 3,583,726, see above;
U.S. Pat. No. 3,679,229, see above;
U.S. Pat. No. 3,680,883, see above;
U.S. Pat. No. 3,770,078, see above;
U.S. Pat. No. 3,727,944, see above;
U.S. Pat. No. 3,831,974, see above;
U.S. Pat. No. 3,841,249, see above;
U.S. Pat. No. 3,915,254, see above; and
U.S. Pat. No. 3,968,978, see above.

Many of the prior art structures fail to provide a quick release mechanism which is readily accessible to the vehicle occupant or, perhaps more importantly, to rescuers attempting to free the vehicle occupant from a crashed vehicle. See:

U.S. Pat. No. 3,833,239 to Coenen, granted Sept. 3, 1974;

and all of the patents listed above.

In some of the structures of the prior art, long and/or curved tracks are provided to carry belt guide loops through intricate paths to attempt to clear restraining belts from the car doorways. Means are provided or at least suggested in these cases to power these belt guide loops into at least partially clearing relationship with respect to the vehicle doorway and with respect to a vehicle occupant taking position on a vehicle seat; and to then power the belts back into a restraining relationship with respect to the vehicle occupant before the vehicle is operated. Such means have been suggested to be powered electrically and hydraulically as well as mechanically. Each such structure apparently calls for a finite time interval after the vehicle door is shut during which time the restraining belts "settle in" to place around the vehicle occupant. Such mechanisms are subject to jamming because of the curved paths, and, where not entirely mechanical, are subject to becoming inoperative upon loss of power, electrical, hydraulic and/or automotive, by the vehicle.

Such structures are shown in the following patents, all of which are fully identified above:
U.S. Pat. No. 3,831,974;
U.S. Pat. No. 3,833,239;
U.S. Pat. No. 3,915,254; and
U.S. Pat. No. 3,968,978.

A search was conducted, and all of the pertinent patents located in that search are set out above.

In the parent application, the Examiner cited but did not apply the following:
U.S. Pat. No. 3,863,983 to Wriedt, granted February of 1975;
U.S. Pat. No. 3,770,294 to Hammer, granted November of 1973;
U.S. Pat. No. 3,680,883 to Keppel, granted August of 1972; and
U.S. Pat. No. 3,833,239 to Coenen, granted September of 1974.

Neither applicant nor those associated with him knows of any closer prior art nor of any prior art which anticipates the invention claimed herein.

To overcome the deficiencies in the prior art and to provide an effective passive restraining belt for seated vehicle occupants, the invention disclosed herein was developed.

BRIEF SUMMARY OF THE INVENTION

In a vehicle having a body, a door hinged at its forward edge to the body, and a seat in the body adjacent the door; a restraining belt apparatus and arrangement includes a restraining belt made up of a two-piece lap belt portion and a shoulder belt portion. The lap belt portion consists of a first inboard lap belt piece received at a first end by a first lockable belt retractor mounted rearward of the vehicle seat and inboard of it and in adjacent relation to the vehicle body floor; and a second outboard lap belt piece received at a first end thereof by a similar second lockable belt retractor mounted rearwardly of the seat on an outboard side of the seat, and in adjacent relation to a bottom edge and a rear edge of a door frame provided in the vehicle body for receiving the door.

A first end of the shoulder belt portion is received by a third lockable belt retractor mounted to the body rearward of the seat and adjacent to the rear edge of the door frame and an upper edge thereof. In the form of the invention shown, conventional inertia-lock retractors can be used; but other lockable retractors would also work.

In one form of the invention shown, the vehicle door is provided with a lower horizontal track mounted along the bottom edge of the door. In another form, this lower track is provided in the vehicle body adjacent the bottom edge of the door.

A slotted or apertured outboard lap belt holder encompasses the outboard lap belt, and is movable with a carrier in the lower track from position adjacent the outboard retractor when the door is closed to a position adjacent the forward edge of the door and door frame when the door is open.

As shown, an upper track is provided on the vehicle body along the upper edge of the door frame, but the upper track could be mounted to the upper edge portion of the door.

A slotted or apertured shoulder belt holder encompasses the shoulder belt and is movable with a carrier in the upper track from position adjacent the shoulder belt retractor when the door is closed to position adjacent the forward edge of the door frame when the door is open.

A quick release mechanism or other fastening device of any usual or preferred construction is provided to releasably fasten second ends of the inboard lap belt piece, outboard lap belt piece and shoulder belt portion to each other.

Means is provided to fasten each of the belt holders to its carrier. In the form of the invention shown, this means is constituted as a belt holder shank adapted to be received into a belt holder shank receiving opening in the carrier frame. The shank is firmly retained in the frame under normal operating conditions. Under conditions of violent stress, as during a crash of the vehicle and/or when the vehicle door is suddenly torn from the car, the belt holder shanks will pull away from their associated carriers. Other means of releasing the belts from the tracks can be provided. For example, the belt holder or track can be made of frangible materials.

A belt travel limit clip can be affixed to one or more of the lap belt pieces and shoulder belt portion to limit the movement of the restraining belt onto any of the retractors, thus to assure that the positioning of the junction of the second ends of the lap belt pieces and the shoulder belt portion consistently returns to a desired location with respect to an occupant of the vehicle seat when the door is closed and the vehicle is in position for travel.

Many of the advantages of the invention can be achieved when the inboard lockable retractor is replaced by another inboard lap belt fastener, but one which fixedly positions the first end of the inboard lap belt piece with respect to itself.

IN THE DRAWINGS

FIG. 1 is a fragmentary top plan view with parts in section and parts broken away of an automotive vehicle showing the relationship of a part of a restraining belt of a first form of the invention with respect to a vehicle seat and an occupant on that seat, the restraining belt being in the restraining position and the vehicle door being closed;

FIG. 2 is also a fragmentary top plan view of the vehicle of FIG. 1 but showing the relationship of parts of the restraining belt with respect to the vehicle, the vehicle seat and the occupant, but with the vehicle door open and with the restraining belt in clearing relation to the occupant and to the vehicle doorway;

FIG. 7 is an enlarged fragmentary detailed sectional view showing the relationship of a lap belt portion of the restraining belt of the invention to a slotted lap belt holder, a carrier, a bottom door track and the open door of the vehicle;

Figure 3:
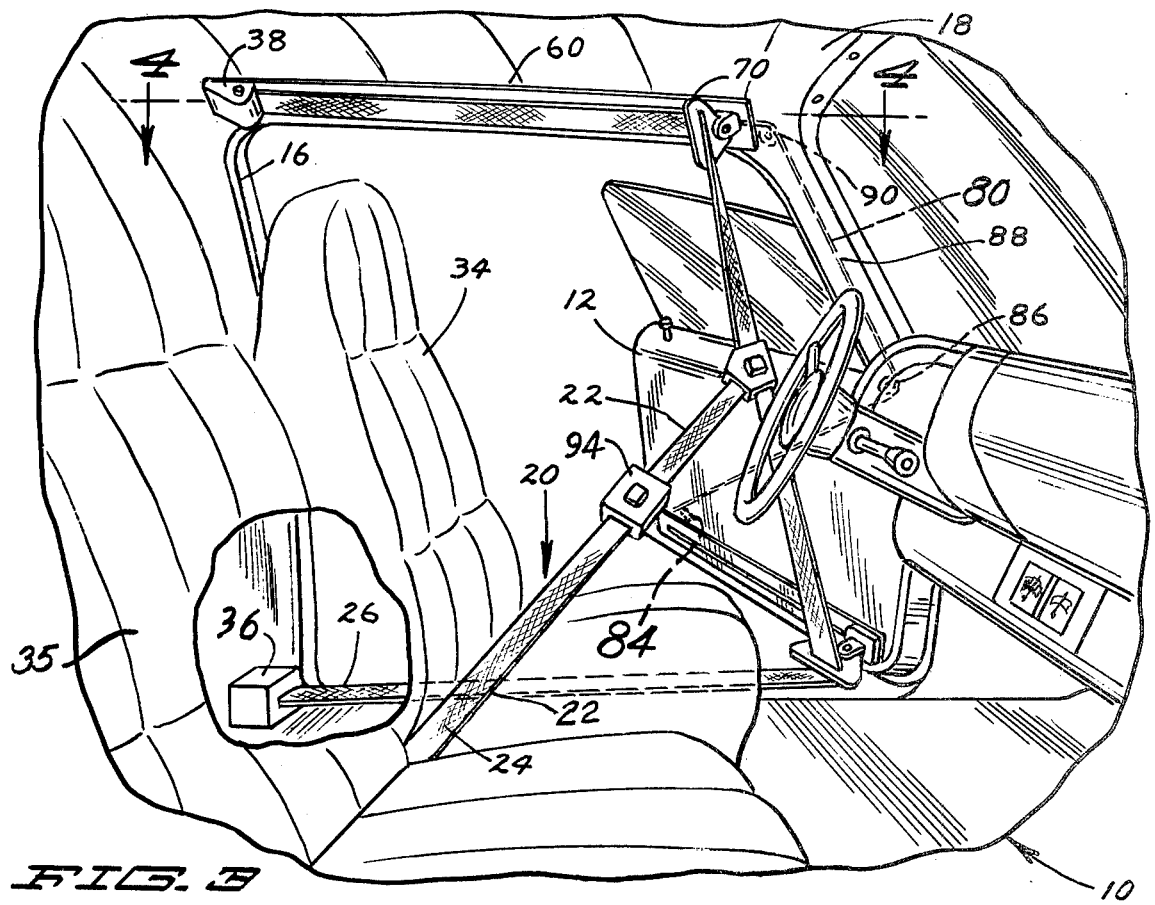
FIG. 3 is a perspective view of the interior of the vehicle of FIGS. 1 and 2 showing the relationship of the restraining belt with respect to the vehicle and vehicle seat with the vehicle door in open position.
Figure 4:
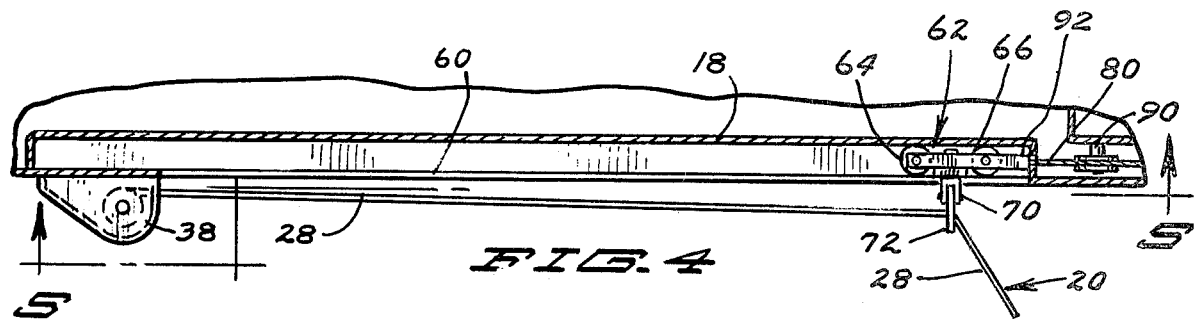
FIG. 4 is an enlarged horizontal sectional view taken on the line 4—4 in FIG. 3.
Figure 5:
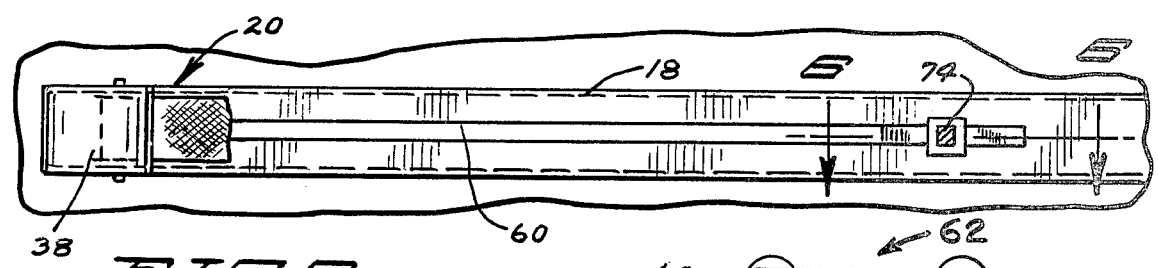
FIG. 5 is an elevational view taken on the line 5—5 in FIG. 4.
Figure 8:
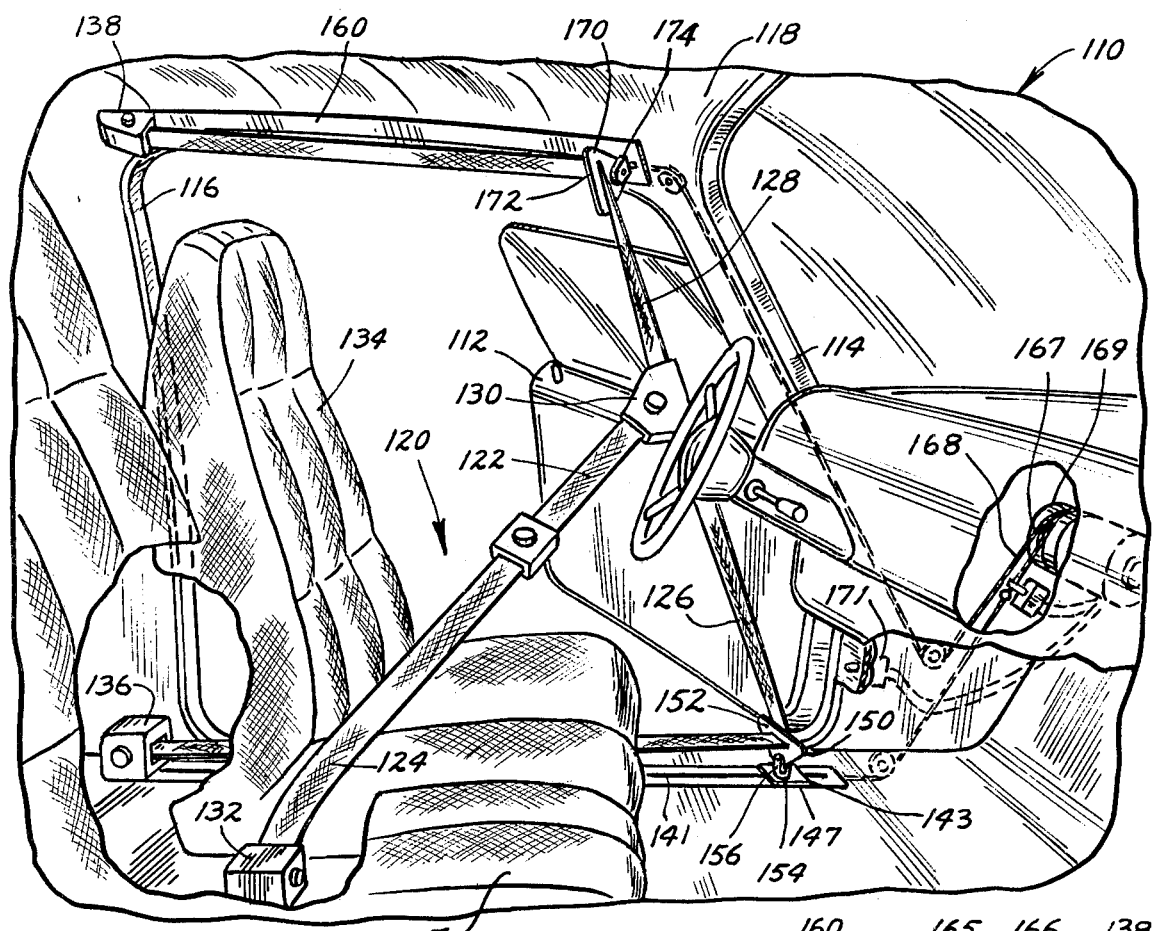
Figure 9:
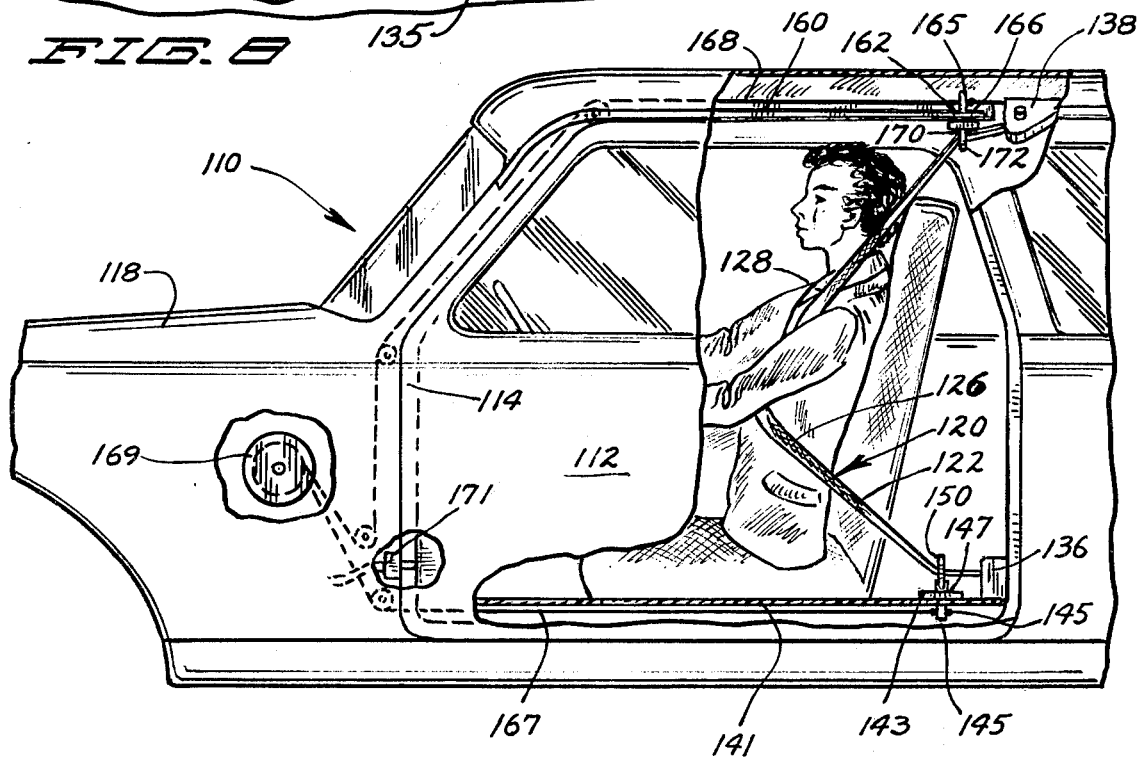

FIG. 8 is a perspective view of the interior of a vehicle similar to the view shown in FIG. 3, but showing a passive restraining belt of a second form of the invention with respect to the vehicle and vehicle seat with the vehicle door in open position; and FIG. 9 is a side elevational view with parts broken away taken from the opposite side of the vehicle shown in FIG. 8, and showing the relationship of the restraining belt of the second form of the invention with respect to a vehicle occupant when the vehicle door is in closed position.

DESCRIPTION OF PREFERRED EMBODIMENTS

In connection with FIGS. 1 through 7 a vehicle 10 illustrated as a passenger car with bucket seats 34 and 35, includes a door 12 hingedly mounted as at 14 to a door frame 16 provided in a vehicle body 18.

A restraining belt 20 of a first form of the invention includes a two-piece lap belt portion 22 which is made up of a first inboard lap belt piece 24 and a second outboard lap belt piece 26. The restraining belt also includes a shoulder belt portion 28. A first end of the inboard lap belt piece 24, the outboard lap belt piece 26 and shoulder belt portion 28 of the restraining belt 20 are releasably joined to each other by a quick release mechanism 30. This quick release mechanism can be adapted to receive and to hold slotted metallic end portions of all three or at least two of the lap belt pieces and shoulder belt portion, and can be constructed so as to release at least two of said pieces and portion in a manner familiar in connection with conventional seat belts in use on automotive vehicles and on passenger airplanes today; or, alternatively, can be of the type which holds the pieces and portion firmly until a cover plate is rotated to an unlock configuration, at which time the ends can be released upon application of pressure on this cover plate. This type of release was used, for example, on parachutes in the German Air Force during World War II. Such a release mechanism 30 can be of any other usual or preferred construction.

A second end of the first inboard lap belt piece 24 is received by a conventional spring return retractor 32 mounted rearwardly and inboard of first bucket seat 34 and adjacent the floor of body 18.

A second end of the second outboard lap belt 26 is received by a conventional spring return inertia-lock retractor 36 which is mounted to the vehicle body 18 rearwardly of the seat 34 and immediately adjacent a rear edge and a bottom edge of the door frame 16.

A second end of the shoulder belt 28 of the restraining belt 20 is received by a conventional spring return inertia-lock retractor 38 which is mounted to the vehicle body 18 rearwardly of seat 34, and adjacent an upper edge and the rear edge of the door frame 16.

The conventional belt inertia-lock retractors 32, 36 and 38 can be of the type which carry the belt they have received on a reel and constantly bias this belt in direction to wind back up on the reel, there being no tendency to impede movement of the belt off of or onto the retractor other than the aforementioned bias unless and until there is a substantial change rate in the inertia of the vehicle. When that happens, the retractors "lock up" so there can be no movement of the restraining belt out of the retractors. The restraining belt then acts to restrain movement of a vehicle occupant encompassed by the belt. Other types of retractors can also be used, if desired.

As shown, a horizontal lower door track 40 is mounted along the lower edge of the door 12 and receives a door track carrier 42 therein. This carrier includes wheels 44 running easily in the track 40 and rotatably mounted with respect to a door track carrier frame 46. As best seen in FIG. 7, the carrier frame 46 is provided with a belt holder shank receiving opening 48.

A slotted outboard lap belt holder 50 extends around the outboard lap belt piece 26. The holder 50 consists of a relatively flat, slotted, belt encompassing portion 52 and a shank portion 54 pivotally mounted as at 56 to the belt encompassing portion 52. The shank 54 is slotted and tapered; and, as best seen in FIG. 7, is shaped to enter into the shank receiving opening 48 of the door track carrier frame 46 and to be held firmly therein until excessive forces are applied to the restraining belt 20 in a manner to be described. At that time, the outboard lap belt holder 50 can pop out of the carrier frame 46.

Figure 6:
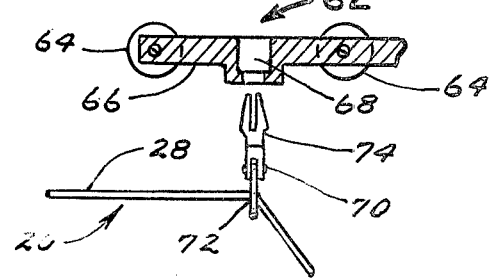
FIG. 6 is an exploded view taken as if on the line 6—6 in FIG. 5.

An upper track 60 is mounted in the vehicle body 18 along the upper edge of the door frame 16. As seen in FIGS. 3 through 6, an upper track carrier 62 includes wheels 64 running easily in the track 60 and rotatably mounted with respect to an upper track carrier frame 66. As best seen in FIG. 6, this carrier frame 66 is provided with a belt holder shank receiving opening 68.

A slotted shoulder belt holder 70 includes a relatively flat, slotted, belt encompassing portion 72 and a shank portion 74. The shank portion is slotted and tapered so as to be easily received into the shank receiving opening 68 of the carrier frame 66, and is so shaped that it will not easily be removed from that carrier frame. However, upon the application of extreme forces, as when a vehicle occupant is thrown against the restraining belt 20, the slotted shoulder belt holder 70 can pop out of the carrier frame 66.

OPERATION

In many cases, the geometry of the shape of the vehicle, the vehicle door frame, vehicle door, the mounting of the vehicle door and the belt retractors, and the strength of the spring returns in the retractors will be such that when the vehicle door is opened, the lower door track carrier 42 will move the slotted outboard lap belt holder 50 to position as seen in FIGS. 2, 3 and 7.

When the door 12 is closed, the spring action of the retractors 32, 36 and 38 acting on the restraining belt 20 will move that belt to position as seen in FIG. 1. This will cause the slotted outboard lap belt holder 50 and the door track carrier 42 to move to position as seen in FIG. 1; and will cause the slotted shoulder belt holder 70 and upper track carrier 62 to move to position adjacent shoulder belt inertia-lock retractor 38 at the rear edge of the door frame 16.

Positive means can be employed to move the slotted shoulder belt holder 70 to position adjacent the forward edge of its upper track 60. A flexible cable 80 is connected to the trailing edge of the door track carrier frame 46 as at 82, and extends parallel to the door track 40 to run over a pulley 84 rotatably mounted within the door 12. The cable extends out through a provided opening (not shown) in a forward edge of the door 12 to run over a pulley 86 which is rotatably mounted in the vehicle body 18 in alignment with a door post 88. From there the cable runs up over a pulley 90, also rotatably mounted in the vehicle body 18 but in alignment with the longitudinal axis of the upper track 60. At that point, cable 80 is affixed to the leading edge of the upper track carrier frame 66 as at 92.

If considered necessary or desirable, positive return action can be assured by attaching a further cable to the leading edge of the door track carrier 42 and the trailing edge of the upper track carrier 62 and providing a return cable path parallel to each of the tracks 40 and 60, and over pulleys mounted on the same axles as the pulleys, 84, 86 and 90, for example.

The geometry of the vehicle and its parts need not be relied on to move the outboard lap belt holder forward. Conventional drive mechanisms can position both carriers and belt holders adjacent the rear ends of the tracks when the vehicle is in an operative condition; and these drive mechanisms can move the carriers to the front ends of the tracks when the vehicle is conditioned to discharge its occupants. Such means is disclosed in connection with a second form of the invention.

Because inertia-lock retractors are used on each side of the vehicle occupant, the vehicle occupant can easily arrange the positioning of the lap belt portion with respect to the shoulder belt portion to conform to the size and shape of the occupant by grasping the quick release mechansim 30 when seated as shown in FIG. 1, and moving it to the right or left or up or down. In this manner, the positioning of the shoulder belt so as not to present an injury problem to the breast of a female occupant, for example, can be assured.

Once the proper positioning of the lap belt portion 22 and the shoulder belt portion 28 of the restraining belt 20 has been achieved for a particular occupant, the automatic returning of the restraining belt to that position every time that occupant returns to the vehicle seat 34 can be achieved by the use of a belt travel limit clip 94 shown in encompassing relationship to the inboard lap belt 24. The clip 94 can have any convenient kind of a friction device and/or fastening device to firmly hold its position on the belt. As shown, a belt release button 96 is positioned on the clip 94 to be depressed when it is desired to have the clip 94 slide freely over the inboard lap belt 24, and released to fix the position of the clip 94 on the belt when that is desired.

As best seen in FIG. 1, once the optimum positioning of the lap belt portion 22 and of the shoulder belt portion 28 of the restraining belt 20 for a particular vehicle occupant has been achieved, by properly positioning the quick release mechanism 30, for example, the belt travel limit clip 94 will be slid down to position in contact with the inboard lap belt inertia-lock retractor 32 and the button 96 released to fix the clip to the belt at that location. When the door is open, the clip 94 will take position substantially as seen in FIGS. 2 and 3. When the door is closed, and if the retracting forces in all three retractors are substantially the same, the shorter retraction length of the inboard lap belt piece 24 will cause the clip 94 to come into contact with the inboard lap belt retractor 32 before the other two retractors have finished bringing in their longer belt portions, and the optimum positioning of the restraining belt 20 will have been reachieved.

Constituting the retraction spring in the inboard belt retractor 32 as stronger than the other springs can assure that the clip 94 will determine the positioning of the restraining belt 20. Similarly, however, the clip 94, or other similar clips, could be put on the other portions of the restraining belt to limit the inward travel of those portions of the belt, also to assure optimum positioning of the belt each time the occupant closes the door to bring the belt into its restraining position.

OPERATION DURING VEHICLE CRASH

With the occupant, restraining belt and vehicle positioned as seen in FIG. 1, upon the occurrence of a vehicle collision or crash the inertia-lock retractors 32, 36 and 38 will instantaneously "lock up" preventing movement of the shoulder belt, inboard lap belt and outboard lap belt with respect to their retractors. Relative movement of the vehicle occupant in a forward direction, as in the case of a head-on collision, or to the side or in any other combination of directions away from the vehicle seat 34, will cause the various portions of the restraining belt 20 to restrain the occupant. In the event that the stress on the belts is great enough, the shoulder belt portion 28 and the outboard lap belt piece 26, in attempting to move to their straight line configuration will pop out of their carriers 62 and 42, respectively. The elongation of these belts when this happens is not sufficient to cause any discernible charge in the relative position of the occupant with respect to the vehicle body 18 and/or the vehicle seat 34.

After the shock of the crash is over, and assuming that the vehicle is still operative, the passive features of the restraining belt can be made operative again simply by replacing the belt holder shanks 54 and 74 back in the shank receiving openings 48 and 68 of the carrier frames 46 and 66, respectively.

This "pop out" feature of the lap belt holder 50 is particularly important in crashes in which the vehicle door separates from the vehicle. In the structure described and claimed herein, the vehicle door can rip clear off without disabling the restraining belt and without allowing the vehicle occupant to move appreciably from the position fixed by the positioning of the three inertia-lock retractors directly on the frame 18 of the vehicle.

When removing a vehicle occupant from a vehicle after a crash, the rescuers have only to reach the quick release mechanism 30 in front of the occupant and operate it to have the restraining belt 20 fall away. This leaves the occupant completely free and unrestrained by the belt 20 and so easily removable.

The restraining belt of the invention has been shown and described as operative to restrain a vehicle occupant who is a driver. The same invention will operate equally well or better with respect to a second bucket seat 35 and/or to a seat adjacent a rear vehicle door.

In connection with FIGS. 8 and 9, in a second form of the invention, a vehicle 110 such as a passenger car with bucket seats 134 and 135, includes a door 112 hingedly mounted as at 114 to a door frame 116 provided in a vehicle body 118.

A restraining belt 120 of the invention includes a two-piece lap belt portion 122 which is made up of a first inboard lap belt piece 124 and a second outboard lap belt piece 126. The restraining belt also includes a shoulder belt portion 128. A first end of the inboard lap belt piece 124, the outboard lap belt piece 126 and the shoulder belt portion 128 are releasably joined to each other by a quick release mechanism 130. This quick release mechanism can be of the same type suggested in connection with the first form of the invention or can be of any usual or preferred construction.

A second end of the first inboard lap belt 124 is received by a conventional spring return, inboard inertia-lock retractor 132 which is mounted to the vehicle body 118 rearwardly and inboard of first bucket seat 134 and immediately adjacent the floor of the body 118.

A second end of the second outboard lap belt piece 126 is received by a conventional spring return, outboard inertia-lock retractor 136 which is mounted to the vehicle body 118 rearwardly of seat 134 and immediately adjacent a rear edge and a bottom edge of the door frame 116.

A second end of the shoulder belt 128 of the restraining belt 120 is received by a conventional spring return, shoulder belt inertia-lock retractor 138 which is mounted to the vehicle body 118 rearwardly of first seat 134, and adjacent an upper edge and a rear edge of the door frame 116.

The conventional belt inertia-lock retractors 132,136, and 138 can be of the type which carry the belt they have received on a reel and constantly bias the belt in direction to wind backup on the reel, there being no tendency to impede movement of the belt off of or onto the retractor other than the aforementioned bias unless and until there is a substantial change of rate of inertia of the vehicle. When that happens, the retractors "lock up" so there can be no movement of the restraining belt out of the retractors. The restraining belt then acts to restrain movement of a vehicle occupant encompassed by the belt.

As shown, a lower horizontal floor track 141 is mounted to the floor of the vehicle body 118 to be in adjacent parallel relationship with respect to the lower edge of the door frame 116. This floor track 141 receives a floor track carrier 143 therein. This carrier includes a pin 145 running easily in track 141 and integral with respect to a floor track carrier frame 147. The floor track carrier frame 147 is provided with a belt holder shank receiving opening which releasably receives the shank of an outboard lap belt holder 140. The connection between this outboard lap belt holder 150 and the floor track carrier frame 147 can be frangible or can be similar to that disclosed between frame 46 and belt holder 50 in connection with FIG. 7 of the first form of the invention.

The holder 150 consists of a relatively flat, slotted, belt encompassing portion 152 and a shank portion 154 pivotally mounted as at 156 to the belt encompassing portion 152.

An upper track 160 is mounted in the vehicle body 118 along the upper edge of the door frame 116. An upper track carrier 162 includes a pin 165 which runs easily in track 160 and is fixedly mounted with respect to an upper track carrier frame 166. The upper carrier frame carries a shoulder belt holder 170.

The pins 145 and 165, running in lower horizontal floor track 141 and upper vehicle body mounted track 160, respectively, are connected to appropriate cables 167 and 168, trained over appropriate pulleys in the body 118 of the vehicle, and running to a twin-drum motor-driven reel 169.

A door operated switch 171 is situated in the body 118 of the vehicle and is for the purpose of energizing the motor driven reel 169 as soon as the door begins to open to move the pins 145 and 165 to the position as seen in FIG. 8. When the door is closed and switch 171 is de-energized, the reel relaxes to allow the cables on the reel to be withdrawn and the belts to assume the positions seen in FIG. 9 by the spring action of the shoulder belt and lap belt retractors. Additional cables and pulleys and other drive means can be provided to move the carrier frames 166 and 147 and consequently the belt holders 150 and 170 to position as seen in FIG. 9, if desired.

The shoulder belt holder 170 includes a relatively flat, slotted, belt encompassing portion 172 and a shank portion 174. The shank portion can be slotted and tapered so as to easily be received into a shank receiving opening of the carrier frame 166, and can be so shaped that it will not easily be removed from that carrier frame. However, upon application of extreme forces, as when the vehicle occupant is thrown against the restraining belt 120, the shoulder belt holder 170 can pop out of the carrier frame 166 in the manner described or suggested in connection with the first form of the invention.

OPERATION OF SECOND FORM OF INVENTION

When the door 112 is closed, the spring action of the retractors 132,136 and 138 acting on the restraining belt 120 will move that belt to the position as seen in FIG. 9. This will cause the outboard lap belt holder 150 and the floor track carrier 143 to move to position as seen in FIG. 9; and will cause the shoulder belt holder 170 and the upper track carrier 162 to move to position adjacent shoulder belt inertia-lock retractor 138 at the rear edge of the door frame 116.

To passively clear and release the seat belt, the vehicle occupant opens the door 112, activating door operated switch 171 to cause cables 167 and 168 to be wound onto the twin drums of motor driven reel 169, drawing the outboard lap belt holder 150 and the shoulder belt holder 170 to positions as seen in FIG. 8. This causes the shoulder belt portion 128, the first inboard lap belt piece 124 and the second outboard lap belt piece 126 of the restraining belt 120 to move into clearing relationship with respect to a vehicle occupant as seen in FIG. 8.

It is obvious that with the various portions and pieces of the restraining belt so positioned, a person to occupy the vehicle can freely climb into and/or climb out of the vehicle without difficulty, and in the manner set out fully in connection with the first form of the invention.

Once the vehicle occupant is seated and closes door 112, the restraining belt 120 again resumes the position as seen in FIG. 9, under the action of the belt return springs in the retractors.

OPERATION DURING VEHICLE CRASH

When there is a collision or crash, in a vehicle equipped with the restraining seat belt arrangement of the second form of the invention, the operation of the seat belt arrangement is the same as that described in connection with the arrangement of the first form of the invention.

The embodiments of the invention in which an exclusive property or privilege is claimed are defined as follows:

1. The combination with a vehicle having a body with a floor and provided with a door frame, a door hingedly mounted at a forward edge thereof with respect to said door frame and a vehicle seat accessible through said door frame, of a passive restraining belt arrangement, said restraining belt arrangement including:

A. a restraining belt comprising a two-piece lap belt portion and a shoulder belt portion;

B. a lockable inboard lap belt retractor mounted adjacent the vehicle floor body, rearwardly of the vehicle seat and inboard of it;

C. a lockable outboard lap belt retractor mounted in an outboard structural portion of the vehicle body rearwardly of the seat, outboard of it and adjacent a rear edge and a bottom edge of the door frame;

D. a lockable shoulder belt retractor mounted to the vehicle body rearward of the seat and adjacent the rear edge and an upper edge of the door frame;

E. said lap belt portion including a first inboard lap belt piece having a first end thereof received by said inboard lap belt retractor and a second outboard lap belt piece having a first end thereof received by said outboard lap belt retractor;

F. said shoulder portion having a first end thereof received by said shoulder belt retractor;

G. means for fastening second ends of said inboard lap belt piece, said outboard lap belt piece and said shoulder belt portion to each other;

H. an upper track mounted in an outboard edge portion of the vehicle roof and extending from a rear end portion positioned adjacent said shoulder belt retractor to a front end portion positioned adjacent a forward edge of the door and door frame;

I. a lower track mounted in a lower edge portion of said vehicle door adjacent the seat and extending from a rear end portion positioned adjacent said outboard lap belt retractor when said door is closed to a front end portion positioned adjacent the forward edge of said door and door frame;

J. an apertured outboard lap belt holder encompassing said outboard lap belt piece and means supporting said holder for movement along said lower track;

K. an apertured shoulder belt holder encompassing said shoulder belt portion and means for supporting said holder for movement along said upper track; and L. means to move said belt holders from rear end portions of said tracks to front end portions thereof upon the opening of said door, and to move said holders from the front end portions of said tracks to the rear end portions thereof upon the closing of the door.

2. The restraining belt arrangement of claim 1 wherein at least two of said lockable belt retractors are of the inertia-lock type.

3. The restraining belt arrangement of claim 2 wherein all three of the lockable belt retractors are of the inertia-lock type.

4. The restraining belt arrangement of claim 1 wherein the means for fastening the second ends of said inboard and outboard lap belt pieces and said shoulder belt portion to each other is constituted as a releasable means.

5. The restraining belt arrangement of claim 4 wherein said releasable means is constituted as a quick release mechanism.

6. The restraining belt arrangement of claim 1 wherein said means for moving said belt holders along said tracks includes cable means operably associated with each of said belt holders to cause one of said belt holders to move in at least one direction along its track responsive to the movement of the other belt holder in the same direction along its track.

7. The restraining belt arrangement of claim 3 wherein a belt travel limit clip is fixedly positioned to one of said inboard lap belt piece, outboard lap belt piece and shoulder portion at location to come into contact with the belt retractor associated with that piece/portion when said restraining belt is positioned in a desired location with respect to the body of a vehicle occupant situated on said vehicle seat with said door in closed position.

8. The restraining belt arrangement of claim 7 wherein said belt travel limit clip is releasable with respect to its associated belt to permit change of its position with respect to that belt in order to achieve other desired relationships with respect to other vehicle occupants seated in said vehicle seat when said door is in said closed condition.

9. The restraining belt arrangement of claim 8 wherein said belt travel limit clip is associated with said inboard lap belt piece.

10. The restraining belt arrangement of claim 1 wherein said means for supporting said holders each with respect to its associated track is operative to hold said belt for movement along said track under normal vehicle operating conditions and to release said belt from said track under conditions wherein the vehicle occupant is forced violently against said restraining belt.

11. The restraining belt arrangement of claim 2 wherein said means for supporting said holders each with respect to its associated track is operative to hold said belt for movement along said track under normal vehicle operating conditions and to release said belt from said track under conditions wherein the vehicle occupant is forced violently against said restraining belt.

12. The restraining belt arrangement of claim 1 wherein said means for supporting at least one of said holders with respect to its associated track includes a carrier supported for longitudinal movement along said track and a connecting link between said carrier and said holder, said link being operative to hold said holder to said carrier under normal vehicle operating conditions and to release said link from said carrier under conditions wherein the vehicle occupant is forced violently against said restraining belt.

13. The restraining belt arrangement of claim 2 wherein said means for supporting at least one of said holders with respect to its associated track includes a carrier supported for longitudinal movement along said track and a connecting link between said carrier and said holder, said link being operative to hold said holder to said carrier under normal vehicle operating conditions and to release said link from said carrier under conditions wherein the vehicle occupant is forced violently against said restraining belt.

14. The combination with a vehicle having a body with a floor and provided with a door frame, a door hingedly mounted at a forward edge thereof with respect to said door frame and a vehicle seat accessible through said door frame, of a passive restraining belt arrangement, said restraining belt arrangement including:

A. a restraining belt comprising a two-piece lap belt portion and a shoulder belt portion;

B. an inboard lap belt fastener mounted adjacent the vehicle body floor, rearwardly of the vehicle seat and inboard of it;

C. a lockable outboard lap belt retractor mounted in an outboard structural portion of the vehicle body rearwardly of the seat, outboard of it and adjacent a rear edge and a bottom edge of the door frame;

D. a lockable shoulder belt retractor mounted to the vehicle body rearward of the seat and adjacent the rear edge and an upper edge of the door frame;

E. said lap belt portion including a first inboard lap belt piece having a first end thereof received by said inboard lap belt fastener and a second outboard lap belt piece having a first end thereof received by said outboard lap belt retractor;

F. said shoulder portion having a first end thereof received by said shoulder belt retractor;

G. means for fastening second ends of said inboard lap belt piece, said outboard lap belt piece and said shoulder belt portion to each other;

H. an upper track mounted in an outboard edge portion of the vehicle roof and extending from a rear end portion positioned adjacent said shoulder belt retractor to a front end portion positioned adjacent a forward edge of the door frame;

I. a lower track mounted in a lower edge portion of said vehicle door adjacent the seat and extending from a rear end portion positioned adjacent said outboard lap belt retractor when said door is closed to a front end portion positioned adjacent the forward edge of said door and door frame;

J. an apertured outboard lap belt holder encompassing said outboard lap belt piece and means for supporting said holder for movement along said lower track;

K. an apertured shoulder belt holder encompassing said shoulder belt portion and means for supporting said holder for movement along said upper track; and L. means to move said belt holders from rear end portions of said tracks to front end portions thereof upon the opening of said door, and to move said holders from the front end portions of said tracks to the rear end portions thereof upon the closing of the door.

15. The combination with a vehicle having a body with a floor and provided with a door frame, a door hingedly mounted at a forward edge thereof with respect to said door frame and a vehicle seat accessible through said door frame, of a passive restraining belt arrangement, said restraining belt arrangement including:

A. a restraining belt comprising a two-piece lap belt portion and a shoulder belt portion;

B. a lockable inboard lap belt retractor mounted adjacent the vehicle body floor, rearwardly of the vehicle seat and inboard of it;

C. a lockable outboard lap belt retractor mounted in an outboard structural portion of the vehicle body rearwardly of the seat, outboard of it and adjacent a rear edge and a bottom edge of the door frame;

D. a lockable shoulder belt retractor mounted to the vehicle body rearward of the seat and adjacent the rear edge and an upper edge of the door frame;

E. said lap belt portion including a first inboard lap belt piece having a first end thereof received by said inboard lap belt retractor and a second outboard lap belt piece having a first end thereof received by said outboard lap belt retractor;

F. said shoulder portion having a first end thereof received by said shoulder belt retractor;

G. means for fastening second ends of said inboard lap belt piece, said outboard lap belt piece and said shoulder belt portion to each other;

H. an upper track mounted on the vehicle adjacent the conjunction of the upper edge of the vehicle door and the vehicle roof when the door is closed and extending from a rear end portion positioned adjacent said shoulder belt retractor when the door is closed to a front end portion positioned adjacent a forward edge of the door and the door frame;

I. a lower track mounted on the vehicle adjacent the conjunction of the lower edge of the vehicle door and the body floor when the door is closed and extending from a rear end portion positioned adjacent said outboard lap belt retractor when said door is closed to a front end portion positioned adjacent the forward edge of said door and door frame;

J. an apertured lap belt holder encompassing said outboard lap belt piece and means for supporting said holder for movement along said lower track;

K. an apertured shoulder belt holder encompassing said shoulder belt portion and means for supporting said holder for movement along said upper track; and L. means to move said belt holders from said rear end portions of said tracks to front end portions thereof upon the opening of said door, and to move said holders from the front end portions of said tracks to the rear end portions thereof upon the closing of the door.

16. The restraining belt arrangement of claim 15 wherein at least two of the lockable belt retractors are of the inertia-lock type.

17. The restraining belt arrangement of claim 16 wherein all three of the lockable belt retractors are of the inertia-lock type.

18. The restraining belt arrangement of claim 15 wherein said lower track is mounted in the vehicle body floor.

19. The restraining belt arrangement of claim 18 wherein all three of the belt retractors are of the inertia-lock type.

20. The restraining belt arrangement of claim 18 wherein said means for moving said belt holders along said tracks includes cable means operably associated with each of said belt holders to cause each of said belt holders to move in at least one direction along its track responsive to movement of the door between open and closed position.

21. The restraining belt arrangement of claim 20 wherein said means for moving said belt holders along said tracks also includes a power driven cable reel operably associated with said cable means, reel control switch means mounted in said body to be operable upon opening of said door to activate said cable reel to wind the cables of said cable means thereon and operable upon closing of said door to deactivate said cable reel.

22. The restraining belt arrangement of claim 21 wherein said inboard lap belt retractor, said outboard lap belt retractor, and said shoulder belt retractor each includes a retractor reel on which its connected portion of the restraining belt is wound and will partially unwind, and means normally biasing said restraining belt portion to wind up on said retractor reel; and wherein said means for moving said belt holders along said tracks after said power driven reel has been deactivated includes said retractor reel biasing means.

23. The restraining belt arrangement of claim 17 wherein a travel limit clip is fixedly positioned on one of said inboard lap belt piece, outboard lap belt piece and shoulder portion at location to come into contact with the belt retractor associated with that piece/portion when said restraining belt is positioned in a desired location with respect to the body of a vehicle occupant situated on said vehicle seat with said door in closed position.

24. The restraining belt arrangement of claim 23 wherein said belt travel limit clip is releasable with respect to its associated belt to permit change of its position with respect to that belt in order to achieve other desired relationships with respect to the other vehicle occupants seated in said vehicle seat when said door is in said closed position.

25. The restraining belt arrangement of claim 15 wherein said means for supporting said holders each with respect to its associated track is operative to hold said belt for movement along said track under normal vehicle operating conditions and to release said belt from said track under conditions wherein the vehicle occupant is forced violently against said restraining belt.

26. The combination with a vehicle having a body with a floor and provided with a door frame, a door hingedly mounted at a forward edge thereof with respect to said door frame and a vehicle seat accessible through said door frame, of a passive restraining belt arrangement, said restraining belt arrangement including:
   A. a restraining belt comprising a two-piece lap belt portion and a shoulder belt portion;
   B. an inboard lap belt fastener mounted adjacent the vehicle body floor, rearwardly of the vehicle seat and inboard of it;
   C. a lockable outboard lap belt retractor mounted in an outboard structural portion of the vehicle body rearwardly of the seat, outboard of it and adjacent a rear edge and a bottom edge of the door frame;
   D. a lockable shoulder belt retractor mounted to the vehicle body rearward of the seat and adjacent the rear edge and an upper edge of the door frame;
   E. said lap belt portion including a first inboard lap belt piece having a first end thereof received by said inboard lap belt fastener and a second outboard lap belt piece having a first end thereof received by said outboard lap belt retractor;
   F. said shoulder portion having a first end thereof received by said shoulder belt retractor;
   G. means for fastening second ends of said inboard lap belt piece, said outboard lap belt piece and said shoulder belt portion to each other;
   H. an upper track mounted on the vehicle adjacent the conjunction of the upper edge of the vehicle door and the vehicle roof when the door is closed and extending from a rear end portion positioned adjacent said shoulder belt retractor when the door is closed to a front end portion positioned adjacent a forward edge of the door and door frame;
   I. a lower track mounted on the vehicle adjacent the conjunction of the lower edge of the vehicle door and the body floor when the door is closed and extending from a rear end portion positioned adjacent said outboard lap belt retractor when said door is closed to a front end portion positioned adjacent the forward edge of said door and door frame;
   J. an apertured outboard lap belt holder encompassing said outboard lap belt piece and means for supporting said holder for movement along said lower track;
   K. an apertured shoulder belt holder encompassing said shoulder belt portion and means for supporting said holder for movement along said upper track; and
   L. means to move said belt holders from rear end portions of said tracks to front end portions thereof upon the opening of said door, and to move said holders from the front end portions of said tracks to the rear end portions thereof upon the closing of the door.

27. The restraining belt arrangement of claim 26 wherein said lower track is mounted in the vehicle body floor.

28. The combination with a vehicle having a body with a floor and provided with a door frame, a door hingedly mounted at a forward edge thereof with respect to said door frame and a vehicle seat accessible through said door frame, of a passive restraining belt arrangement, said restraining belt arrangement including:
   A. a restraining belt comprising a two-piece lap belt portion;
   B. an inboard lap belt fastener mounted adjacent the vehicle body floor, rearwardly of the vehicle seat and inboard of it;
   C. a lockable outboard lap belt retractor mounted in an outboard structural portion of the vehicle body rearwardly of the seat, outboard of it and adjacent a rear edge and a bottom edge of the door frame;
   D. said lap belt portion including a first inboard lap belt piece having a first end thereof received by said inboard lap belt fastener and a second outboard lap belt piece having a first end thereof received by said outboard lap belt retractor;
   E. means for fastening second ends of said inboard lap belt piece and said outboard lap belt piece to each other;
   F. a lower track mounted on the vehicle adjacent the conjunction of the lower edge of the vehicle door and the body floor when the door is closed and extending from a rear end portion positioned adjacent said outboard lap belt retractor when said door is closed to a front end portion positioned adjacent the forward edge of said door and door frame;
   G. an apertured outboard lap belt holder encompassing said outboard lap belt piece and means for supporting said holder for movement along said lower track;
   H. means to move said belt holder from the rear end portion of said track to the front end portion thereof upon the opening of said door, and to move said holder from the front end portion of said track to the rear end portion thereof upon the closing of the door; and
   I. means operative on said restraining belt to support said second end portions of said lap belt pieces in spaced relation forwardly of and above said vehicle seat as said belt holder moving means moves said belt holder to and from said front end portion of said track.

* * * * *